United States Patent
Lopez et al.

(10) Patent No.: US 9,924,635 B1
(45) Date of Patent: Mar. 27, 2018

(54) AIR BLOW OFF COVER FOR SYNCHRO-KNIFE DRIVE CLEANING

(71) Applicant: CNH Industrial America LLC, New Holland, PA (US)

(72) Inventors: Javier Lopez, Garín (AR); Antonio Bosquet, Araucaria (BR); Felipe Ramina, Curitiba (BR); Sergio Inglat, Curitiba (BR); Rodrigo Avila, Curitiba (BR); Renato Ribeiro, Campo Largo (BR)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/278,530

(22) Filed: Sep. 28, 2016

(51) Int. Cl.
| A01D 34/30 | (2006.01) |
| A01D 34/40 | (2006.01) |
| A01D 75/00 | (2006.01) |
| A01D 34/04 | (2006.01) |
| A01D 34/14 | (2006.01) |
| A01D 34/32 | (2006.01) |
| A01D 69/00 | (2006.01) |

(52) U.S. Cl.
CPC ............. *A01D 75/00* (2013.01); *A01D 34/04* (2013.01); *A01D 34/14* (2013.01); *A01D 34/32* (2013.01); *A01D 69/002* (2013.01)

(58) Field of Classification Search
CPC ........ A01D 34/04; A01D 34/14; A01D 34/30; A01D 34/305; A01D 34/32; A01D 65/00; A01D 57/02; A01D 57/10; A01D 69/002; A01D 75/00

USPC ...... 56/10.1, 12.8, 12.9, 257, 296–298, 307, 56/313

See application file for complete search history.

(56) References Cited

U.S. PATENT DOCUMENTS

| 2,737,006 | A | | 3/1956 | Klingler | |
| 3,091,906 | A | * | 6/1963 | Hall | A01D 34/003 56/1 |
| 4,407,112 | A | * | 10/1983 | Shepherd | A01D 43/077 56/13.4 |
| 4,474,835 | A | | 10/1984 | Brewer | |
| 4,866,919 | A | | 9/1989 | Brooks | |
| 4,905,461 | A | * | 3/1990 | Heuer | A01D 34/003 56/12.8 |
| 4,909,025 | A | * | 3/1990 | Reissig | A01D 34/305 56/257 |
| 4,936,082 | A | * | 6/1990 | Majkrzak | A01D 57/02 56/220 |
| 5,609,011 | A | * | 3/1997 | Kuhn | A01D 34/005 56/17.5 |
| 6,800,025 | B2 | | 10/2004 | Pope et al. | |
| 6,910,320 | B1 | | 6/2005 | Thorman et al. | |

(Continued)

FOREIGN PATENT DOCUMENTS

| DE | 102005040711 | 3/2006 |
| EP | 1393610 | 8/2006 |
| EP | 1930188 | 11/2009 |

*Primary Examiner* — Robert E Pezzuto
(74) *Attorney, Agent, or Firm* — Peter K. Zacharias; Patrick M. Sheldrake

(57) ABSTRACT

A header of an agricultural harvester or plant cutting machine is provided that includes a shaft sealing assembly for a center knife drive assembly having an output shaft, a cover, and a pressurized air source. The shaft sealing assembly is fastened to the cover, circumscribes the output shaft and conveys pressurized air for cleaning.

5 Claims, 7 Drawing Sheets

(56) References Cited

U.S. PATENT DOCUMENTS

| | | | |
|---|---|---|---|
| 7,591,127 B1 * | 9/2009 | Stacer | A01D 65/00 56/12.9 |
| 7,810,304 B2 * | 10/2010 | Priepke | A01D 34/30 56/257 |
| 7,870,713 B2 * | 1/2011 | Schroeder | A01D 57/10 56/12.8 |
| 8,011,272 B1 | 9/2011 | Bich et al. | |
| 8,087,221 B2 | 1/2012 | Sugio et al. | |
| 8,151,547 B2 | 4/2012 | Bich et al. | |
| 9,192,097 B2 | 11/2015 | Cook | |
| 2014/0090346 A1 | 4/2014 | Wilbert | |
| 2014/0109540 A1 | 4/2014 | Cook | |
| 2014/0290200 A1 | 10/2014 | Trowbridge et al. | |
| 2015/0163994 A1 | 6/2015 | Bich | |
| 2016/0081266 A1 | 3/2016 | Bosquet et al. | |

\* cited by examiner

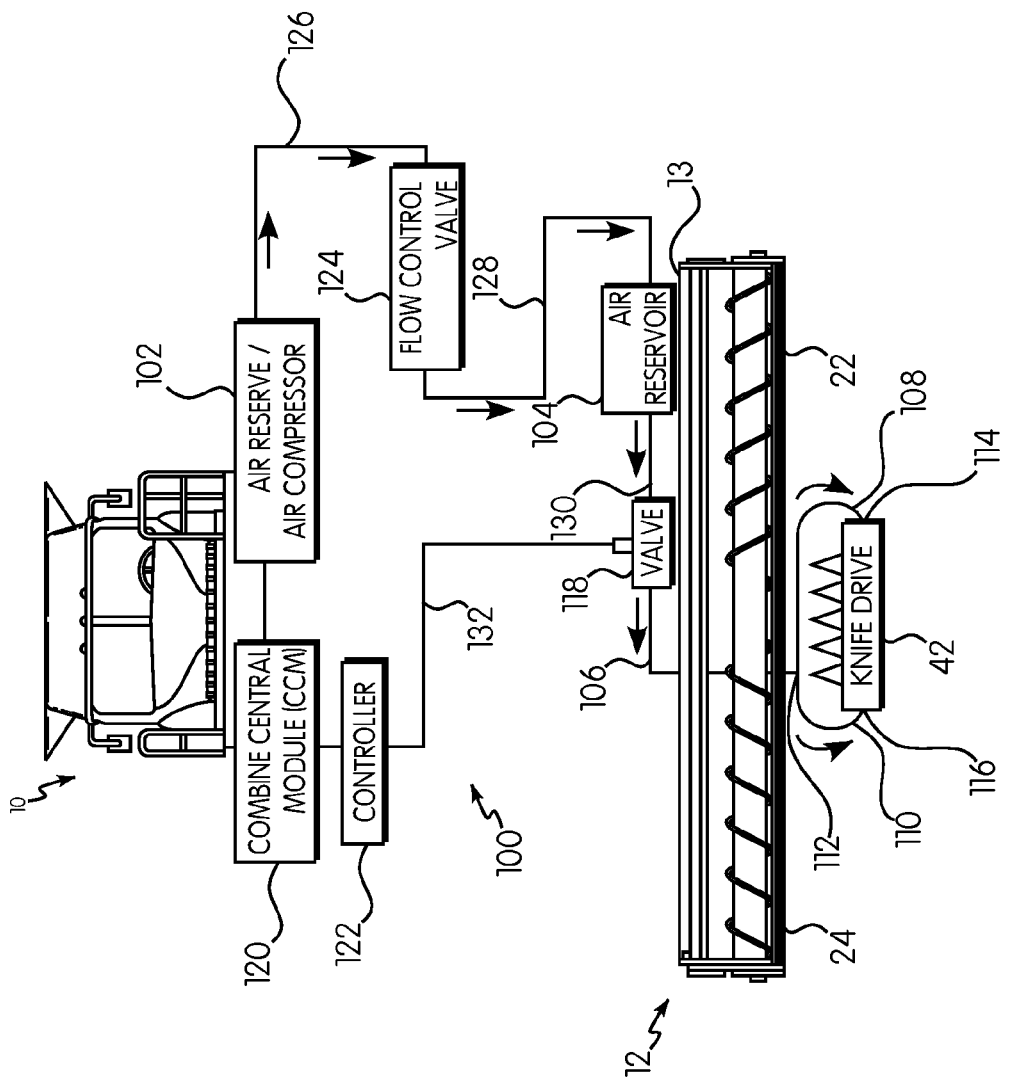

AIR BLOW OFF COVER FOR SYNCHRO-KNIFE DRIVE CLEANING

BACKGROUND OF THE INVENTION

The present invention relates generally to plant cutting assemblies for use with agricultural harvesters. In particular, the subject application relates to an assembly for preventing debris intrusion and collection within a center knife drive of a harvester. The assembly includes a sealing assembly for an output shaft of the center knife drive and a pressurized air source.

Sickles, typically including cutterbars supporting a row of knives, are used to cut plants including, but not limited to, hay, grasses and small grains. In harvester equipment the knives are constructed as a plurality of knife or sickle sections which are mounted in side-by-side relation forming an elongate metal knife assembly or cutterbar. The knife assembly is normally supported so as to slide longitudinally along an elongate stationary bar that has forwardly projecting, spaced apart guards. The knife assembly moves back and forth in reciprocating motion to move the knives relative to the guards so that the leading knife edges cross over the guards or move through slots in the guards. This motion produces a shearing or cutting action which severs plant stems or stalks or other material that becomes captured between the knives and the guards.

In a harvesting machine such as a combine, a pair of such cutterbars and stationary bars are supported in connection with a cutting head or header and are oriented so as to extend laterally or widthwise along a forward edge portion of structure such as a floor or pan of the header. The floor defines the lower extent of a cut crop or plant flow area, which can include conveying apparatus such as one or more augers or belts. The conveying apparatus is oftentimes operable in cooperation with a harvesting reel for conveying the cut plant material to a feederhouse inlet of the combine.

The pair of cutterbars can be driven by one or two centrally located knife drives which derive their power from power take offs operatively connected to the combine. The knife drives include one or more output shafts that are generally vertically oriented, the reciprocating rotational motion of which are transferred to the cutterbars as a reciprocating lateral motion. A problem with the knife drives is that, because of their location in or below the header floor or pan, the drives are at least partially contained in a relatively low profile or flat housing or cover upon which loose crop material and other undesirable material such as dust, dirt and debris can accumulate. This situation is disadvantageous because, if allowed to accumulate, such material can quickly insulate the drive and reduce dissipation of heat generated by operation of the knife drives. The result can be overheating and premature failure of knife drive components.

In addition, accumulated material can become lodged between the knife drives and the underside of the floor or pan and can even become compacted into a solid mass which limits or prevents upward movement of the knife drive during operation. Likewise, accumulated material can become lodged around the output shafts, which limits or prevents the reciprocating rotational movement of the output shafts. This can be problematic, for instance, if the drive is used with a cutterbar or sickle that can flex upwardly or when the cutterbar is configured to float so as to be movable upwardly toward the header floor or pan. Failure of the cutterbar to flex or move fully upwardly may result in the cutterbar becoming immersed in the soil rather than severing crop close to the ground surface which can result in damage to the cutterbar and/or the knife drive.

BRIEF SUMMARY OF THE INVENTION

In accordance with a first aspect, the present invention provides a center knife drive assembly for a plant cutting machine having a center knife drive, a cover, a shaft sealing assembly and a pressurized air source. The center knife drive includes an output shaft. The cover is for covering the center knife drive, and the output shaft extends through a through hole of the cover. The shaft sealing assembly is attached to the cover and includes an annular cover circumscribing the output shaft. The pressurized air source delivers pressurized air to the center knife drive adjacent to the output shaft and below the shaft sealing assembly.

In accordance with a second aspect, the present invention provides a header of a harvester having a frame and a center knife drive assembly. The frame is for attaching to the harvester. The center knife drive assembly is attached to the frame and includes a center knife drive, a cover, a shaft sealing assembly, and a pressurized air source. The center knife drive has an output shaft. The cover covers the center knife drive and the output shaft extends through a through hole of the cover. The cover has a generally frustoconical portion defining a raised region for receiving the output shaft. The frustoconical portion includes a sidewall and a top wall. The shaft sealing assembly is attached to the cover and includes an annular cover and a ring. The annular cover circumscribes the output shaft and has a frustoconical inner portion, a middle portion and a lower peripheral portion. The lower peripheral portion directly attaches to the top wall of the frustoconical portion of the cover. The ring is for fixing the annular cover to the cover. The pressurized air source delivers air to the center knife drive adjacent to the output shaft and below the shaft sealing assembly.

In accordance with a further aspect, the present invention provides a harvester comprising a header. The header includes a center knife drive assembly. The center knife drive assembly has a center knife drive, a cover, a shaft sealing assembly, and a pressurized air system. The center knife drive has an output shaft. The cover covers the center knife drive and the output shaft extends through a through hole of the cover. The cover has a generally frustoconical portion defining a raised region for receiving the output shaft. The shaft sealing assembly is attached to the cover and includes an annular cover and a washer. The annular cover circumscribes the output shaft and has a frustoconical inner portion, a middle portion and a lower peripheral portion. The lower peripheral portion directly attaches to the top wall of the frustoconical portion of the cover. The washer is for fixing the annular cover to the cover. The pressurized air system delivers pressurized air to the center knife drive adjacent to the output shaft and below the shaft sealing assembly. The pressurized air system has a pressurized air source, a conductor and a conductor fitting. The pressurized air source is mounted to the harvester. The conductor is connected to the pressurized air source. The conductor fitting is for attaching a branch of the conductor to the angled sidewall of the frustoconical portion of the cover. The pressurized air system has a pressurized air source, and ways to conduct the pressurized air to the desired regions. The air delivery can be made through hoses, tubes or equivalent and its respective end fittings. For clarity, and to not limit the scope of the invention, the ways to deliver the air will be referred to as pneumatic conductors or just as conductors.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 7 is a schematic view of an agricultural harvester, header and pressurized air delivery system according to an aspect of the present invention.

DETAILED DESCRIPTION OF THE INVENTION

Reference will now be made in detail to the preferred embodiments of the invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Ranges throughout this disclosure and various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

The terms "corn," "ear," "stalk," and "crop material" are used throughout the specification for convenience and it should be understood that these terms are not intended to be limiting. Thus, "corn" refers to that part of a crop which is harvested and separated from discardable portions of the crop material. The plant cutting assembly of the subject application is applicable to a variety of crops, including but not limited to wheat, soybeans and small grains. The terms "debris," "material other than grain," and the like are used interchangeably.

Figure 1:
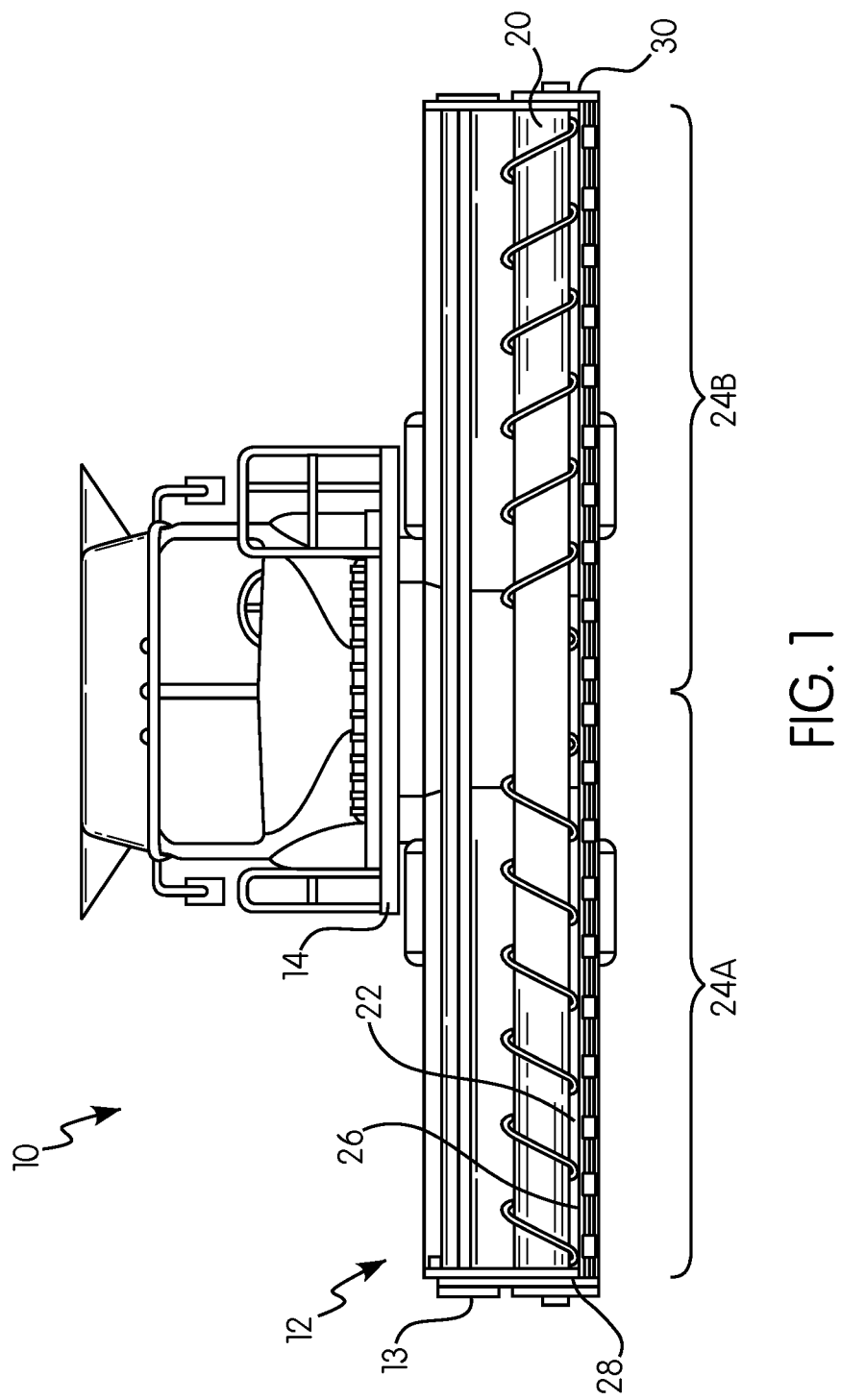
FIG. 1 is a front elevation view of an agricultural harvester including a header in accordance with a preferred embodiment of the present invention.
Figure 2:
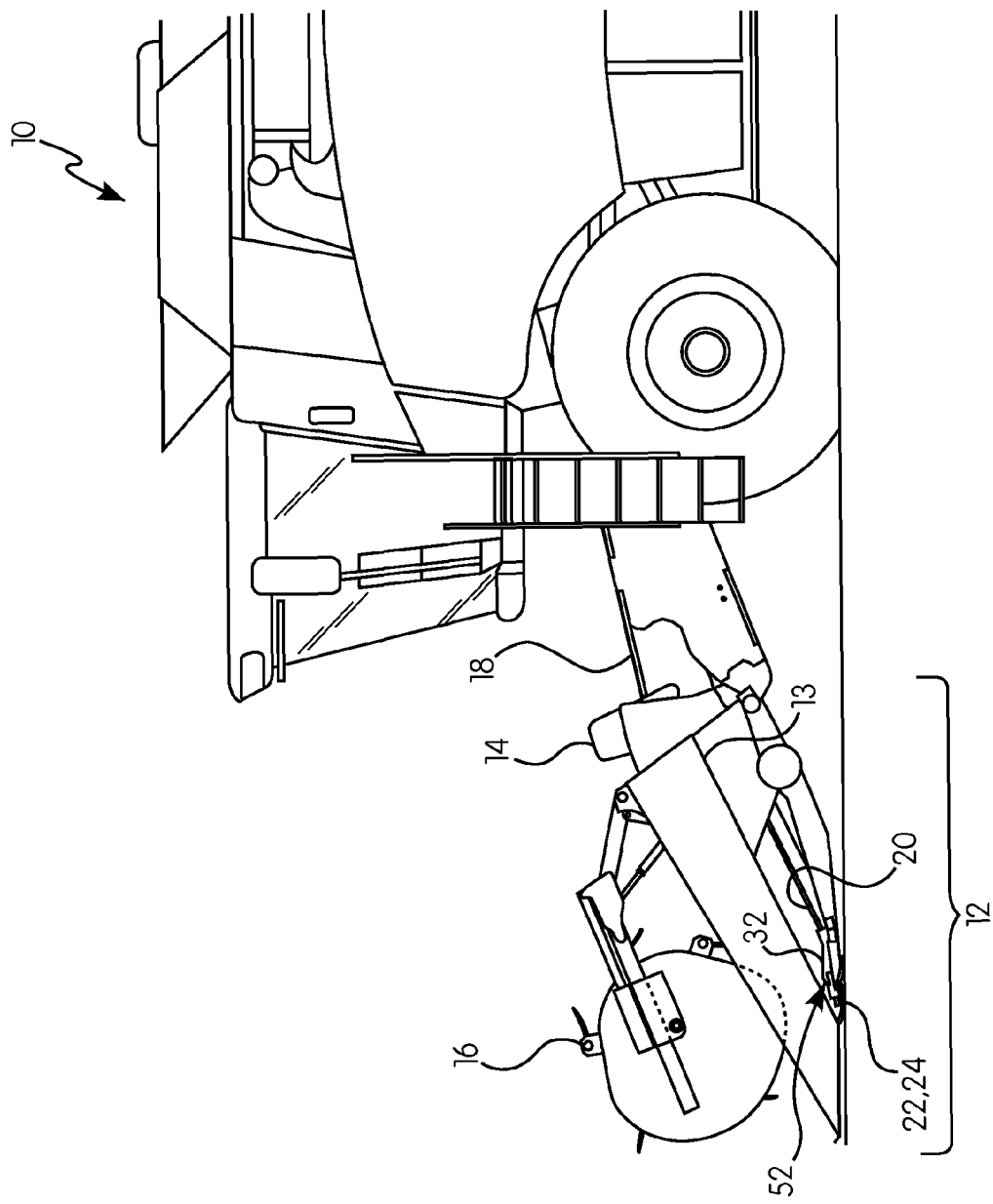
FIG. 2 is partial side elevation view of a harvester including a header having a center knife drive according to another aspect of the present invention.

Referring now to the drawings wherein aspects of the present invention are shown, FIGS. 1-2 illustrate an agricultural harvester 10 such as a combine. Harvester 10 includes a header 12 having a chassis or frame 13 which is attached to a forward end 14 of the harvester, more specifically to a feeder house 18. Header 12 is configured to cut crops as harvester 10 moves forward over a crop field, and may include a reel 16, an auger and/or draper belts 20 for moving crop material sidewardly to the center along the header width and subsequently rearwardly, feeding the crop material to the harvester 10 through the feeder house 18.

Figure 3:
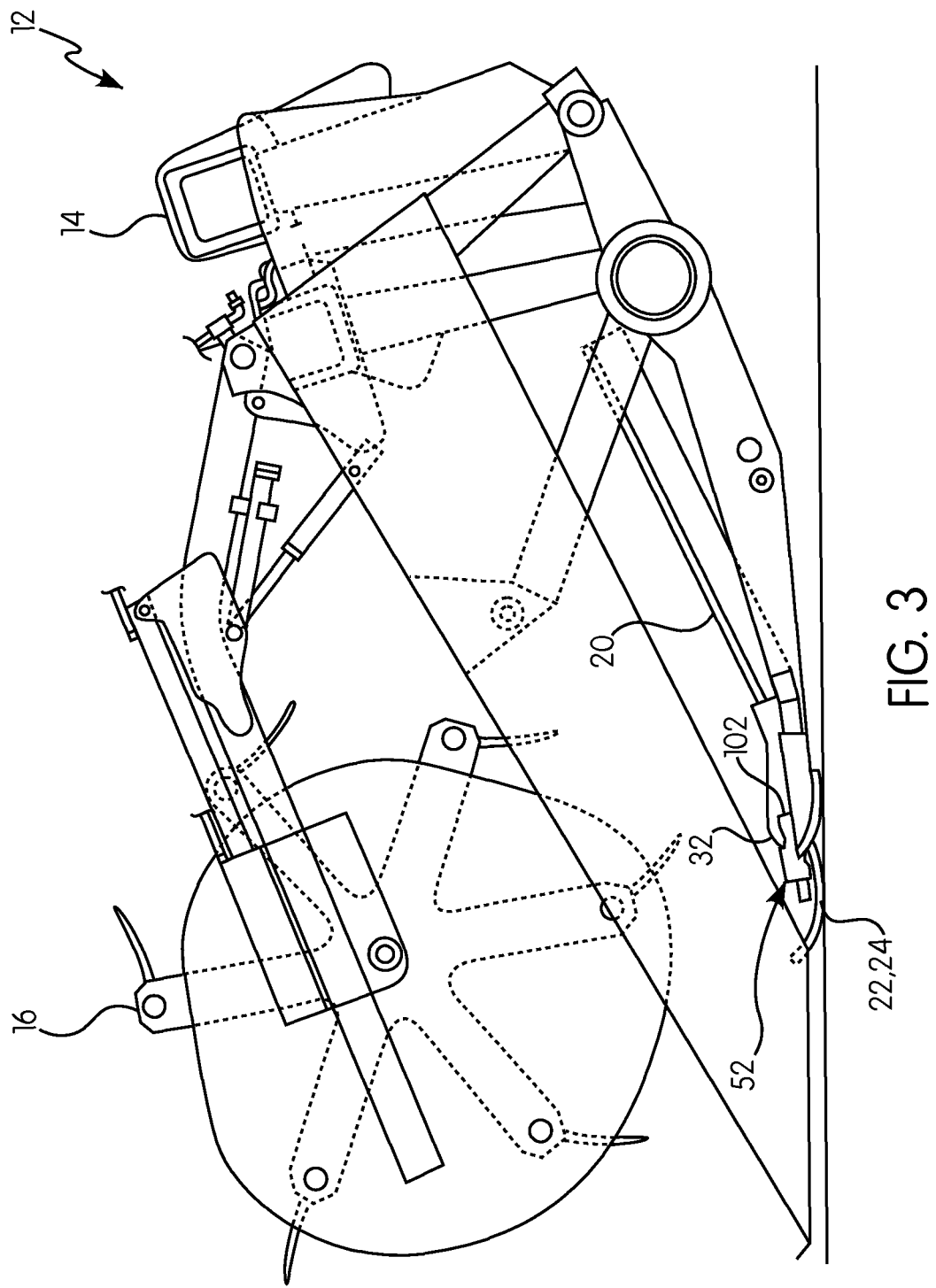
FIG. 3 is a partial side elevation view of the header and aspects of the center knife drive of the harvester of FIG. 2.

Structurally, header 12 includes a pan or floor 22 that is supported in a desired proximity to the surface of the field during the harvesting operation as shown in FIGS. 2 and 3, and an elongate, sidewardly extending cutterbar 24 along a forward edge portion 26 of the floor. Cutterbar or sickle 24 is operable for severing the plants or crop for induction into header 12.

Figure 4:
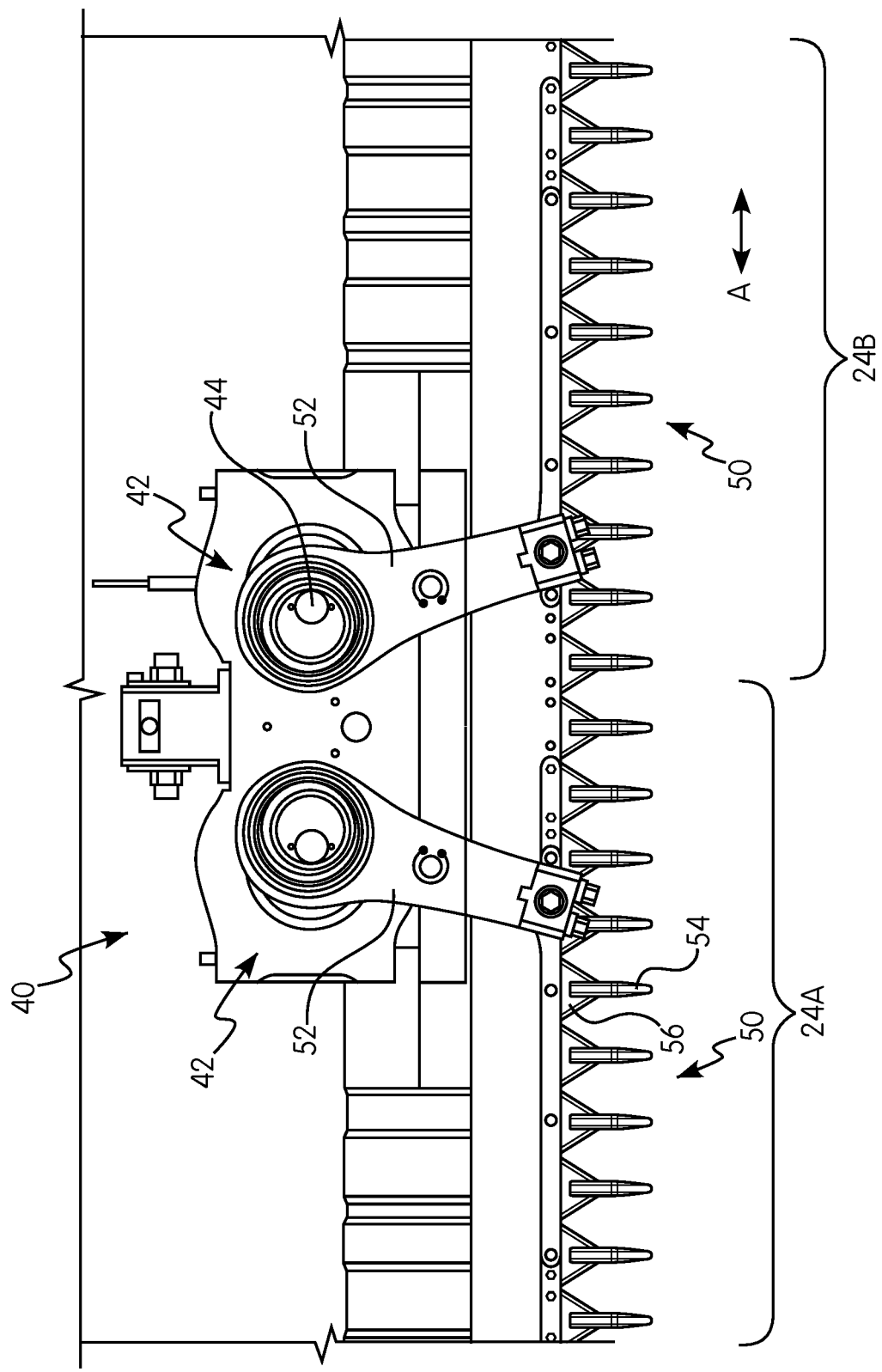
FIG. 4 is a partial top plan view of a header including a center knife drive according to an aspect of the present invention with certain parts omitted.

Referring more particularly to FIGS. 1 and 4, cutterbar 24 is an exemplary cutterbar applicable to the present invention and extends in a sideward direction along the width of floor 22, between a first side edge portion 28 of the floor and an opposite second side edge portion 30. Cutterbar 24 includes an elongate, sidewardly extending first cutter bar assembly 24A and an elongate, sidewardly extending second cutter bar assembly 24B extending in end to end relation to the first cutter bar assembly. The cutter bar assemblies 24A, 24B are supported in substantially longitudinally aligned relation adjacent to forward edge portion 26 of floor 22. Additional details regarding the cutter bar applicable to the present invention are disclosed in U.S. Pat. No. 8,151,547, the entire disclosure of which is hereby incorporated by reference herein in its entirety for all purposes.

Figure 5:
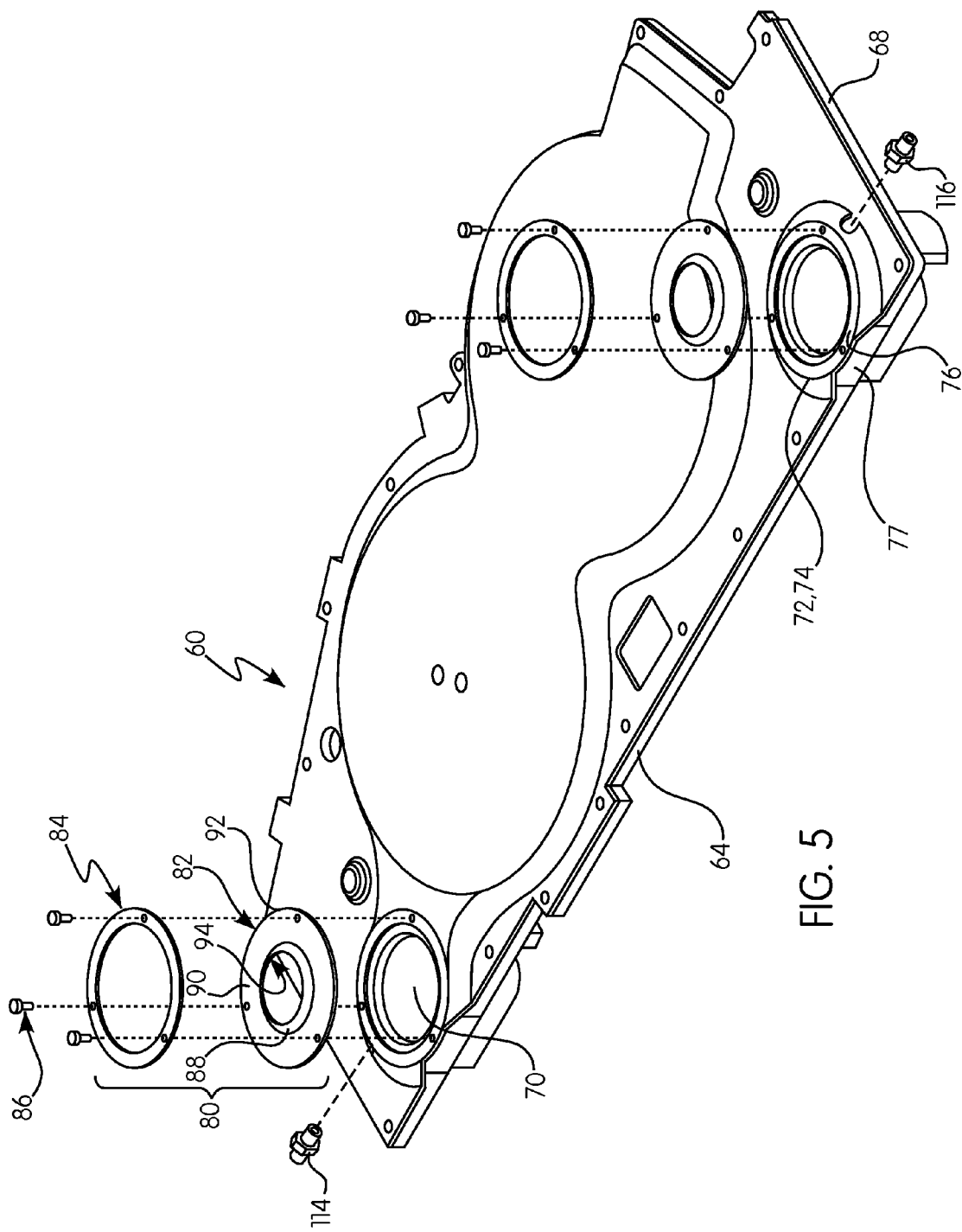
FIG. 5 is a perspective view of a cover for a knife drive according to a preferred embodiment of the present invention.

The header 12 further includes a center knife drive assembly 40, as shown in FIG. 4. As best shown in FIG. 5, the center knife drive assembly 40 includes a cover 60, a shaft sealing assembly 80 and a pressurized air source 100, as shown in FIG. 6.

As best shown in FIG. 4, center knife drive assembly 40 has a center knife drive 42 and an output shaft or pinion 44. The center knife drive 42 may be located beneath, or incorporated into, the floor 22 of the header 12 and is connected to the cutterbar 24.

In the exemplary embodiment shown in FIG. 4, two knife drives 42 each having an output shaft 44 are provided. The center knife drive 42 may be powered by a power source such as a fluid motor, a PTO shaft, an electric motor, a belt drive, or the like. Two or more such center knife drives 42 may be coordinated in the timing of rotation of the output shafts 44, such that the system is considered a synchro knife drive. Such a center knife drive may be driven by a single power source or multiple power sources.

Figure 6:
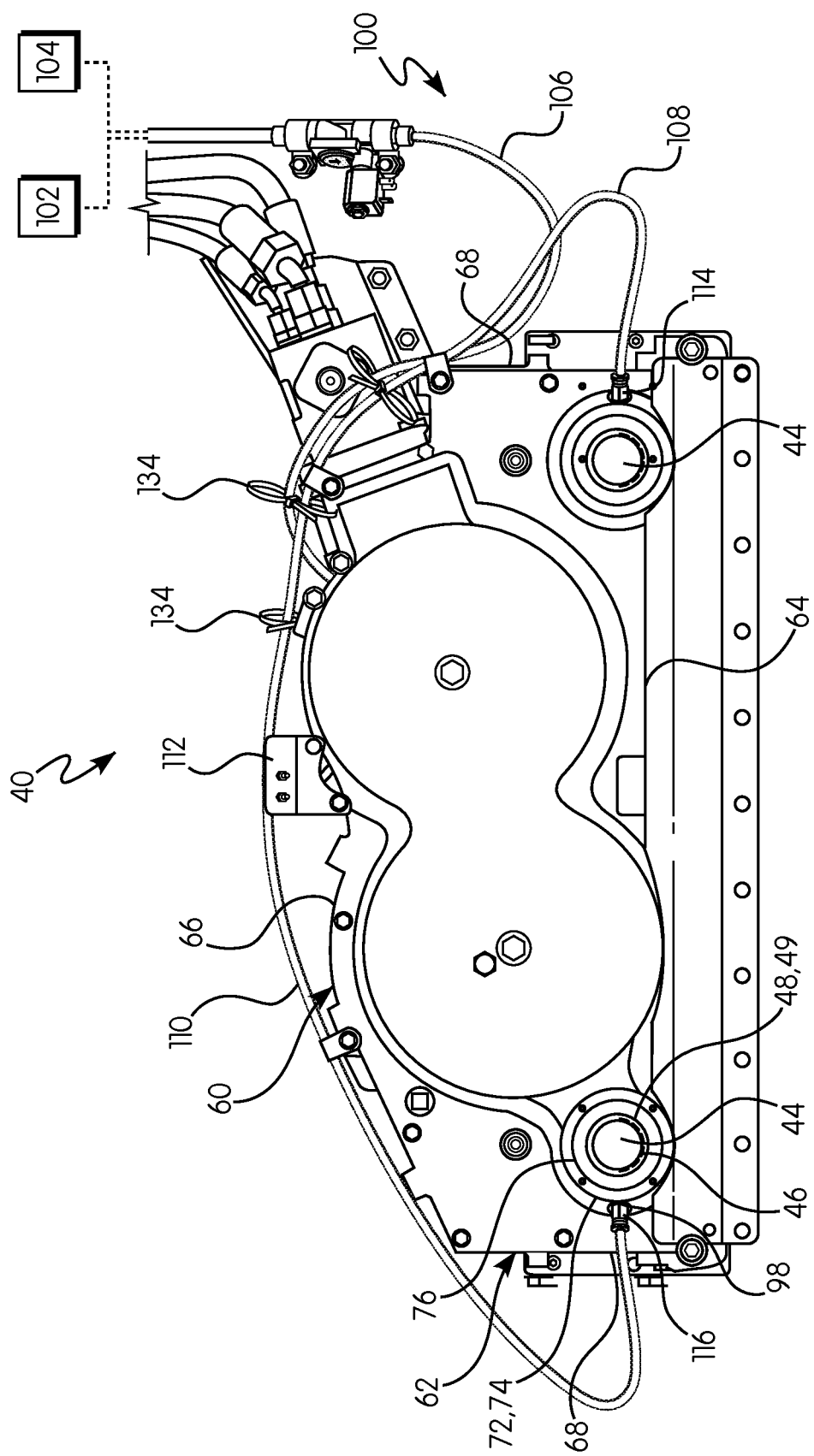
FIG. 6 is a top plan view of the cover of FIG. 5 with a partial view of a pressurized air system.

The output shaft 44 of the center knife drive 42 extends upwardly as shown in FIGS. 4 and 6 and is configured for reciprocating rotational motion. In other words, the output shaft 44 extends longitudinally upward from the center knife drive 42 and through the cover 60. The output shaft 44 may be generally or substantially cylindrical, and may have a splined portion 46 extending about all or a portion of a perimeter 48 of an upper portion 49 of the output shaft.

Referring to FIGS. 5 and 6, cover 60 is provided for covering the knife drive assembly 40 and is bounded by a peripheral edge 62, including a forward edge portion 64 and an opposite rear edge portion 66 with side edge portions 68 therebetween. The cover 60 has a through hole 70 for receiving output shaft 44. In the embodiment illustrated, a pair of through holes 70 are located near corners at the front edge portion 64 and side edge portions 68, although other locations about the cover may be used.

The cover 60 includes a frustoconical portion 72 around through hole 70, having an angled sidewall 74 and a top wall 76. The frustoconical portion 72 creates a raised region of the cover and is preferably circular, substantially circular, or generally circular. In other words, the cover 60 includes a generally frustoconical portion 72 defining a raised region for receiving the shaft sealing assembly 80, as further described below. The angle of the frustoconical portion 72 may be varied between about 0 and about 90 degrees, preferably between about 30 and about 60 degrees, and most preferably between about 40 and about 50 degrees. Other shapes that are suitable for the intended purpose are also contemplated, such as pyramidal or cubic.

The angled sidewall 74 of frustoconical portion 72 of cover 60 includes an opening 78 for receiving a part of the pressurized air source 100, as further described below. The opening 78 may alternatively be located in the top wall 76 or in a portion of the cover 60 that is adjacent to the frustoconical portion 72.

As shown in FIG. 5, the top wall 76 of the cover includes holes for receiving one or more fasteners 86, as further described below.

In the illustrated embodiment of FIG. 5, a cutout 77 is made in the frustoconical portion 72 of cover 60 creating a substantially flat face to allow the frustoconical portion, and therefore output shaft 44, to be located near forward edge 64. The existence and extent of such a cutout 77 is a function of the desired location of the output shaft 44 and through hole 70.

Referring again to FIGS. 5 and 6, the forward edge portion 64 of cover 60 is preferably substantially straight with side edge portions 68 being substantially straight and disposed at substantially right angles to the front edge portion. The rear edge portion 66 has a series of curves and angles corresponding to the underlying structure of the knife drive assembly. Various changes in size and shape of the peripheral edge 62 of cover 60 are contemplated, so long as the cover functions to generally cover the knife drive assembly 40, to where it is mounted.

As shown in FIGS. 5 and 6, the center knife drive assembly 40 of header 12 includes a shaft sealing assembly 80 mounted at through hole 70 of cover 60 and positioned to circumscribe the output shaft 44 of center knife drive 42. The shaft sealing assembly 80 includes an annular cover 82, a ring 84 and one or more fasteners 86.

The annular cover 82 of shaft sealing assembly 80 includes an inner portion 88, a middle portion 90 and a lower peripheral portion 92. The inner portion 88 extends from the middle portion 90 in a first direction radially inwardly, and the lower peripheral portion 92 extends from the middle portion 90 in a second direction radially outwardly. The annular cover 82 is preferably integrally formed of one piece of metal, although multi-part constructions may be arranged using metal or other materials.

The inner portion 88 of annular cover 82 is preferably frustoconical and includes an inner surface 94 that is sized to fit closely around output shaft 44 of center knife drive without inhibiting the reciprocating rotational motion of the output shaft. The angle of the frustoconical inner portion 88 may be varied between about 0 and 90 degrees, preferably between about 30 and about 60 degrees, and most preferably between about 40 and about 50 degrees.

The middle portion 90 of annular cover 82 is generally flat and planar and preferably substantially flat and planar, as shown in FIG. 5, although it may be angled or curved between the inner portion 88 and lower peripheral portion 92. The middle portion 90 may be located above or contiguous with lower peripheral portion 92, and may be of a same or smaller thickness than the lower peripheral portion.

The lower peripheral portion 92 of annular cover 82 is preferably substantially flat and has one or more holes for receiving the one or more fasteners 86. The lower peripheral portion 92 directly attaches to the cover 60. As such, the annular cover 82 directly attaches to the cover 60.

The ring or washer 84 of shaft sealing assembly 80, as shown in FIG. 5, is for fastening the annular ring 82 to the cover 60. In the present embodiment, the ring is mounted directly to the annular cover 82 at the lower peripheral portion 92. The shape and size of ring 84 generally correspond to the shape and size of lower peripheral portion 92, and preferably the respective shapes and sizes substantially match each other.

Likewise, the ring 84, lower peripheral portion 92 of annular cover 82, and top wall 76 of cover 60 have corresponding locations of one or more holes to receive the one or more fasteners, e.g., bolts. They are also arranged to fit closely together by being generally flat and parallel, although other complementary shapes may be used.

The fastener 86 of shaft sealing assembly 80 fastens sequentially through ring 84, annular cover 82, and cover 60. The ring and annular cover are preferably formed from a metal and, as such, the fastened connection between parts does not create a hermetic seal such that it is possible for air to escape the system between component surfaces. To avoid any sort of leakage, and to better direct the air flow to the output shaft 44, a chemical sealing is applied in between the lower peripheral portion 92 of the annular cover 82 and the top wall 76 of the cover 60. The chemical sealing can be replaced by a gasket or equivalent as long as its thickness does not substantially increase the overall height of the shaft sealing assembly 80.

To clean and limit buildup of debris and loose material around cover 60 and output shaft 44, and generally within the center knife drive assembly 40, a pressurized air delivery system or pressurized air source 100 is provided. The pressurized air delivery system 100 may be considered a pneumatic knife drive cleaning apparatus. As best shown in FIGS. 6 and 7, the pressurized air delivery system may include one or more sources 102, 104 of pressurized air, conductors 106, 108, 110, tee fitting 112 for dividing conductor 106 into conductors 108 and 110, and conductor couplers 114, 116. In other words, the pressurized air source is delivered by a conductor, such as one or more of conductors 106, 108, 110. The conductor couplers 114, 116 are preferably located near each output shaft 44, although any location within the center knife drive 40 is possible. As such, when the center knife drive assembly includes a second output shaft 44 and a second shaft sealing assembly 80, the pressurized air source 100 delivers pressurized air to the center knife drive 42 adjacent to the second output shaft 44 via conductor coupler 116.

Conductor couplers 114, 116 preferably mount at or near the frustoconical portion 72 of cover 60 so as to discharge a spray of pressurized air toward the output shaft 44 and knife drive 42 in order to remove dirt, debris, crop material and other unwanted matter from the knife drive during operation of the harvester. The air spray impinges upon a substantial portion of the knife drive 42 for thorough cleaning of the knife drive structure during operation of harvester 10. In other words, the pressurized air source 100 is connected to the raised region of the cover 60 for blowing air on and around the output shaft 44. In a preferred embodiment, the pressurized air source 100 is directly connected to a sidewall 74 of the frustoconical portion 72 of the cover 60.

Referring to FIG. 7, it is shown that the pneumatic knife drive cleaning apparatus 100 includes at least one source of pressurized air 102, 104 carried by one or both of the harvester 10 and the header 12. Header 12 also includes a valve 118 operatively connected to a valve actuator in a combine control module 120 carried by the header 12 or the harvester 10. The valve actuator includes a controller 122 on which a duty cycle is programmed. The controller 122 is operable to open the valve 118 during an active state of the duty cycle and to close the valve during an inactive state of the duty cycle.

Further details of the pressurized air delivery system 100 include a flow control valve 124 and delivery lines 126, 128, 130 and 132, shown in FIG. 7. Additional details regarding a pressurized air delivery system and header cleaning apparatus applicable to the present invention are disclosed in U.S. Patent Application Publication No. 2016/0081266, the entire disclosure of which is incorporated by reference herein in its entirety for all purposes. The pressurized air delivery system may further include ties 134, as shown in FIG. 6, for tethering the conductors 106, 108, 110 to the cover 60 and/or knife drive assembly 40.

The foregoing arrangement of the header 12 provides a system for preventing collection of debris by the combination of covering and blowing air out of the center knife drive assembly 40. The cover 60 and shaft sealing assembly 80 are shaped, sized and connected so as to inhibit excess debris falling into the center knife drive assembly, and to maximize the cleaning effect of blown air on the output shaft 44 in particular, as well as the rest of knife drive assembly 40. The frustoconical portion 72 of the cover 60, together with the shaft sealing assembly 80, provides a generally conic area circumscribing the output shaft 44 so as to direct pressurized air toward and around the output shaft while also preventing the ingress of debris from above.

When assembled, the center knife drive assembly 40 powers the cutterbar 24. The cutterbar 24 includes a knife assembly 50 including a knife arm 52 connected to the output shaft 44. As shown in FIG. 3, when two output shafts are provided, two knife arms 52 are reciprocatingly driven by the output shafts 44 of the center knife drive 42. Knife drive assembly 40 is illustrated in FIG. 4 at a center location on header 12, although it is contemplated that center knife drive 42 could be used at various locations on a header and that multiple knife drives could be used.

As best shown in FIG. 4, knife arms 52 project forwardly from the center knife drive 42 in the vicinity of forward edge portion 26 of floor 22, for connection to the respective knife assemblies 50, and which are moved in a side to side (i.e., lateral) reciprocating motion by center knife drive 42, for effecting a cutting action A. Knife arms 52 will be located directly in the path of the rearward flow of cut plant material over forward edge 26 during plant cutting operations. As a result, some loose plant material and debris can be expected to pass along the knife arms 52 toward output shafts 44 and the center knife drive assembly 40 in general.

Referring also to FIGS. 2-4, each knife assembly 50 includes a row of knife sections including oppositely facing, angularly related knife edges 56, which, in conjunction with adjacent guards 54, effect a shearing or cutting action which severs plant stems and stalks or other material captured between the knives and the guards as the knife sections are reciprocatingly moved sidewardly, as denoted by arrows A.

In operation during harvesting, harvester 10 moves forward and the cutterbars 24 reciprocate sideways driven by the knife drive assembly 40. Crop material is cut from plants and directed rearwardly along the header toward the feeder 18 of harvester 10. Loose material and debris are created and moved by the cutting of plants, motion of the harvester 10, and operation of the knife drive assembly 40. The cover 60 and shaft sealing assembly 80 serve to inhibit this loose material and debris from collecting in the knife drive assembly 40. The pressurized air delivery system 100 cleans any loose material and debris that does impinge upon the knife drive assembly 40, particularly that which impinges upon the output shaft 44. The cover 60 and shaft sealing assembly 80 direct the pressurized air around the output shafts 44 and knife drive 42, aiding in the cleaning process.

It will be appreciated by tconductor skilled in the art that changes could be made to the preferred embodiments described above without departing from the broad inventive concept thereof. As noted, the location of the through hole in the cover may be changed depending on the desired location of the output shaft, which in turn may be based on a desired size and range of sideways cutting motion for the cutter bars. Additionally, the angular frustoconical parts of the illustrated embodiment may be curved concavely or convexly. It is to be understood, therefore, that this invention is not limited to the particular embodiments disclosed, but it is intended to cover modifications within the spirit and scope of the present invention as defined by the appended claims.

We claim:

1. A header of a harvester comprising:
a frame for attaching to the harvester; and
a center knife drive assembly attached to the frame, the center knife drive assembly including:
  a center knife drive having an output shaft,
  a cover covering the center knife drive and wherein the output shaft extends through a through hole of the cover, the cover including a generally frustoconical portion defining a raised region for receiving the output shaft, the frustoconical portion having a sidewall and a top wall,
  a shaft sealing assembly attached to the cover, the shaft sealing assembly including:
    an annular cover circumscribing the output shaft, the annular cover having:
      a frustoconical inner portion,
      a middle portion, and
      a lower peripheral portion, wherein the lower peripheral portion directly attaches to the top wall of the frustoconical portion of the cover, and
    a ring for fixing the annular cover to the cover; and a pressurized air source delivering pressurized air to the center knife drive adjacent to the output shaft and below the shaft sealing assembly.

2. The header of claim 1, wherein the annular cover and ring are formed from a metal.

3. The header of claim 1, wherein the pressurized air source is directly connected to the sidewall of the frustoconical portion of the cover.

4. The header of claim 1, wherein the center knife drive further comprises a second output shaft and a second shaft sealing assembly, the pressurized air source further delivering pressurized air to the center knife drive adjacent to the second output shaft.

5. A harvester comprising:
   a header including:
      a center knife drive assembly having:
         a center knife drive having an output shaft,
         a cover covering the center knife drive and wherein the output shaft extends through a through hole of the cover, the cover having a generally frustoconical portion having an angled sidewall and a top wall, the frustoconical portion defining a raised region for receiving the output shaft,
         a shaft sealing assembly attached to the cover, the shaft sealing assembly having:
            an annular cover circumscribing the output shaft, the annular cover comprising:
               a frustoconical inner portion,
               a middle portion, and
               a lower peripheral portion, wherein the lower peripheral portion directly attaches to the top wall of the frustoconical portion of the cover, and
            a washer for fixing the annular cover to the cover; and
      a pressurized air system delivering pressurized air to the center knife drive adjacent to the output shaft and below the shaft sealing assembly, the pressurized air system having:
         a pressurized air source mounted to the harvester,
         a conductor connected to the pressurized air source, and
         a conductor fitting for attaching a branch of the conductor to the angled sidewall of the frustoconical portion of the cover.

\* \* \* \* \*